Dec. 7, 1937.   B. FULLER   2,101,057
MOTOR VEHICLE
Filed Oct. 18, 1933   4 Sheets-Sheet 1
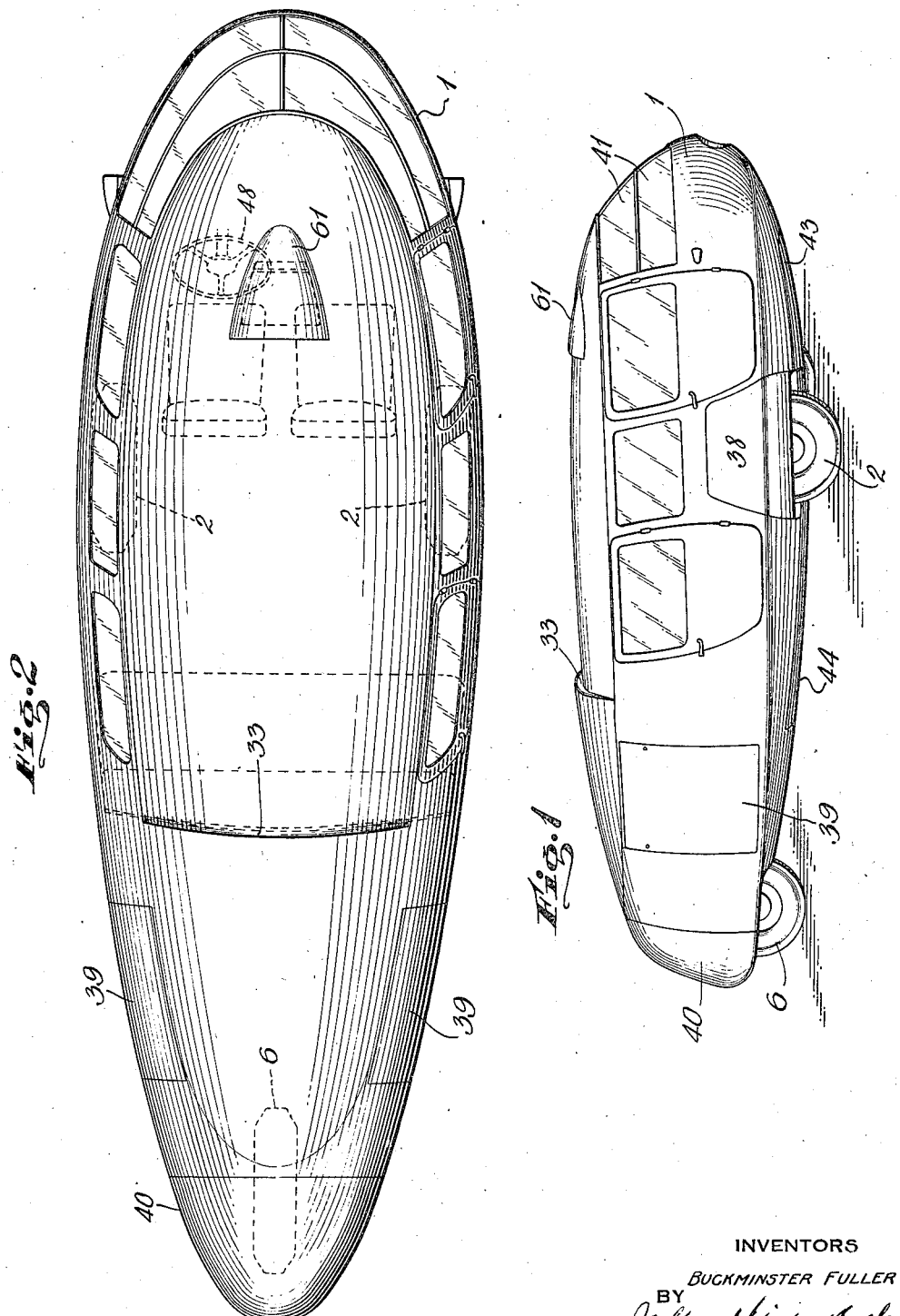
INVENTORS
BUCKMINSTER FULLER
BY
ATTORNEYS Dec. 7, 1937.　　　　　B. FULLER　　　　　2,101,057
MOTOR VEHICLE
Filed Oct. 18, 1933　　　　4 Sheets-Sheet 2
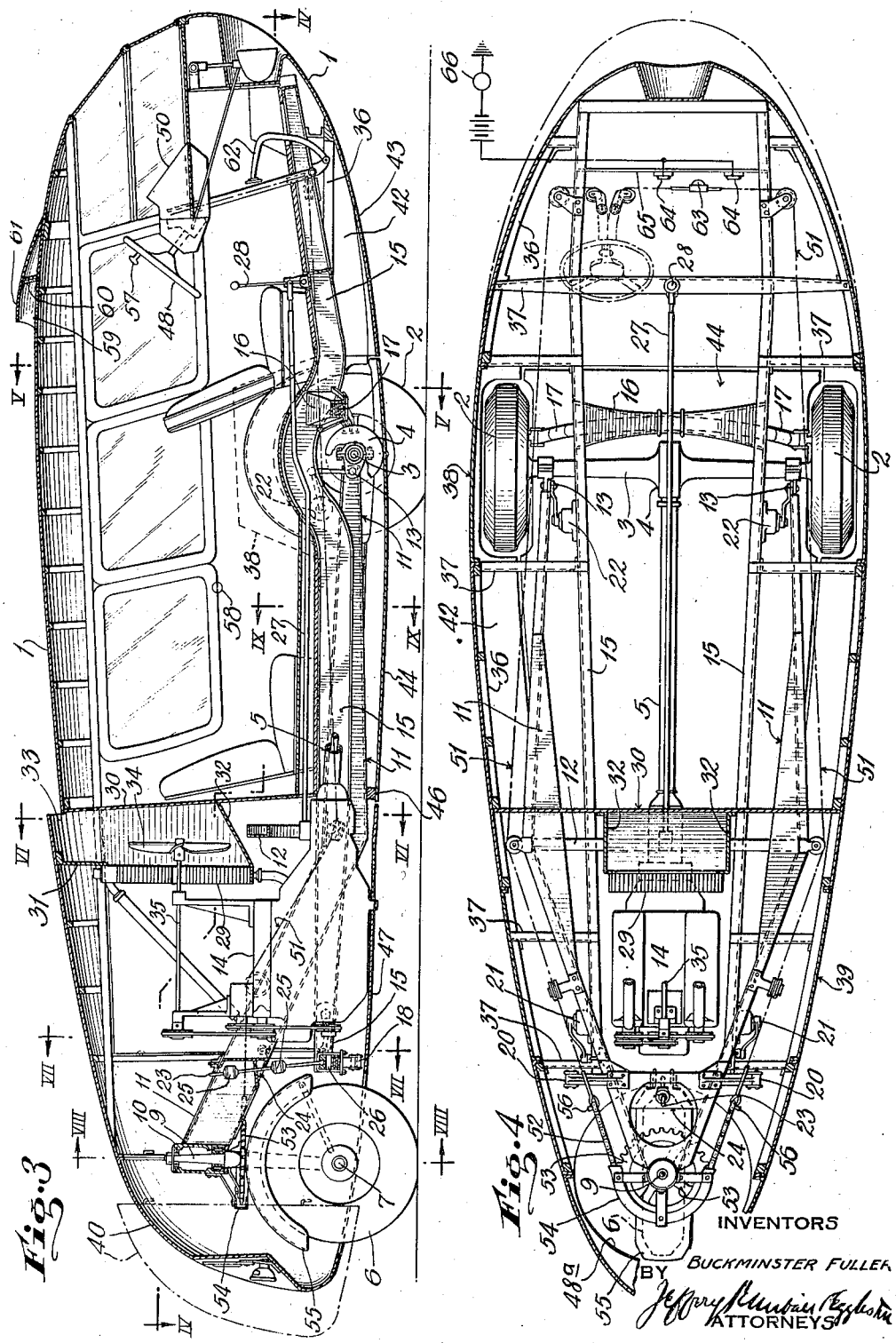
INVENTORS
BUCKMINSTER FULLER
BY
ATTORNEYS

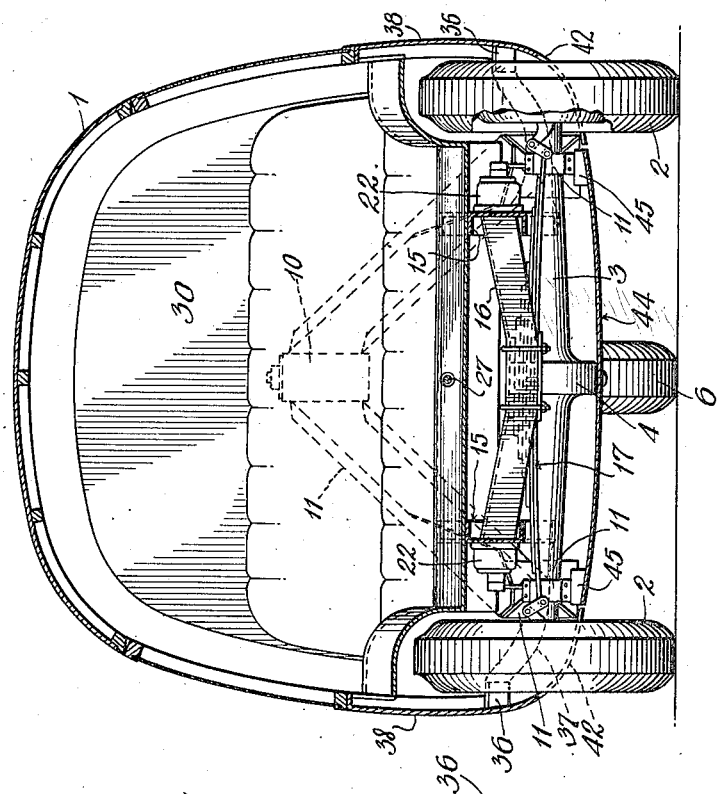

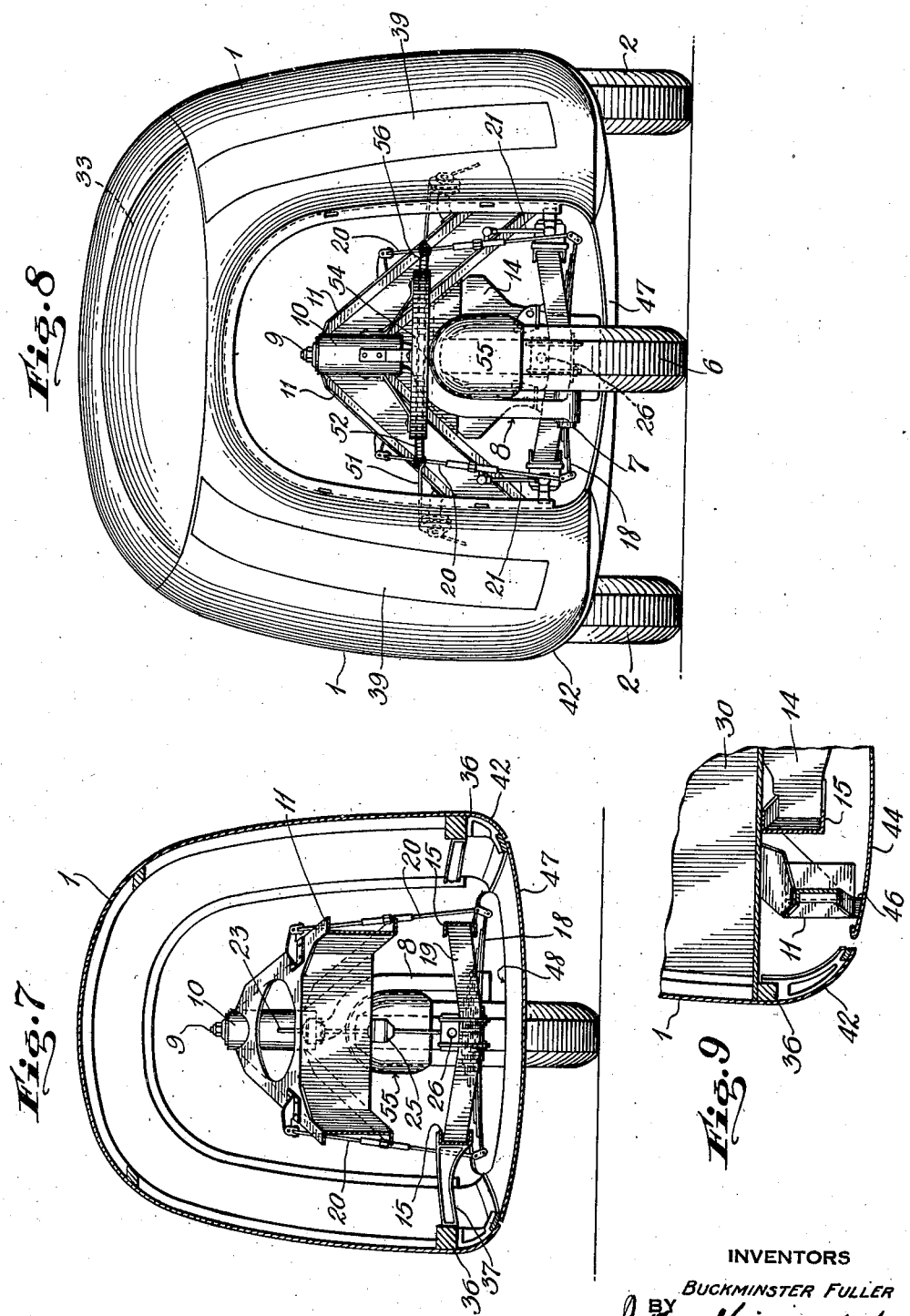

Patented Dec. 7, 1937

2,101,057

UNITED STATES PATENT OFFICE 2,101,057

MOTOR VEHICLE

Buckminster Fuller, Bridgeport, Conn., assignor to The Dymaxion Corporation, Bridgeport, Conn., a corporation of Connecticut Application October 18, 1933, Serial No. 694,068
In Great Britain September 8, 1933

26 Claims. (Cl. 180—27)

The invention relates to the construction of motor road vehicles whereby they are adapted to the economical operation resulting from full streamline formation and whereby other and independent advantages are obtained as will be apparent to those skilled in this art from this disclosure. The principles of the invention are exemplified by the vehicle illustrated in the accompanying drawings, but without limitation to such particular form.

Fig. 1 is a side view of the vehicle.
Fig. 2, a top plan.
Fig. 3, a longitudinal vertical section.
Fig. 4, a horizontal section on line IV—IV.
Fig. 5, a cross section on line V—V.
Fig. 6, a cross section on line VI—VI.
Fig. 7, a cross section on line VII—VII.
Fig. 8, an end view at line VIII—VIII with bussle removed.
Fig. 9, a detail section on line IX—IX.

The streamline body covers or encloses all of the chassis including all the wheels. For best economy it should be so designed that every axial section has a full streamline contour, which is to say that the body should be continuously curved from a round or blunt front to a tapered tail and that all its transverse maximum diameters should occur at a point about one-third of the length from the front end with no substantial interruption to the curvature and with no more excrescencies exposed to the relative wind than necessary for operation. The front wheels 2 are the driven or traction wheels and are located at the widest part of the streamline body, that is, at a point about one-third of its length from the front end. They are journalled at the ends of an axle structure or housing 3 and driven through differential gearing indicated at 4 by a propeller shaft 5 or in any equivalent differential manner. The axle structure may be the same as the rear axle structure of standard automobiles.

The forward wheels can be organized as the steering wheels within the broader aspect of this invention, but it is preferred that the steering is done by a rear wheel or wheels such as indicated at 6 which is central of the two forward wheels, being journalled on a stub shaft 7 rigidly fixed in the end of a single-tined steering fork 8, the head 9 of which is swivelled to turn on an upright axis. This wheel is preferably of the same size as the forward wheels and interchangeable therewith as in standard automobiles, being readily removed from its stub shaft on the single-tined fork. It may however be dual-tired if desired, or may consist of twin wheels turning together as a unit or like a single wheel and such variants are to be understood as included within the term single steering wheel as used herein.

The steering head 9 is journalled on vertically spaced bearings in a deep barrel socket 10 formed in the rear apical end of a generally triangular or A-shaped frame 11 herein termed the sub-frame, and is slightly castored therein as shown in Fig. 3, to facilitate steering. The forwardly extending legs of this frame 11 are supported on the forward axle housing 3 close to the front wheels 2, thus to provide a wide bearing for the sub-frame on the forward wheels and it has deep web sections with liberal flanging and gusseting and is reinforced by an arched cross-brace 12, all for the purpose of producing a maximum degree of rigidity in the torsional sense between the steering head and axle housing. Such rigidity is important in three-wheeled vehicles intended for passenger car speeds because, if the steering axis is not kept to a plane parallel with the planes of the front wheels (or if these are canted, then to an intermediate plane bisecting the angle between them) the steering becomes unsteady and dangerous. On this account the sub-frame 11 is specially stiffened as stated and no spring intervenes between it and the wheels such as might permit the steering axis to change its lateral position in relation to the forward wheels. In this sense the sub-frame is an unsprung frame. It may however be connected to the axle by a joint, if the joint axis is horizontal and such joint is preferably used and appears at 13, where the ends of the frame legs are attached to the axle housing. It does not impair the rigidity of the frame against torsion. Preferably also the sub-frame is dropped or formed with an angle at or near the cross brace so that its forwardly extending leg members are substantially horizontal and at about the level of the wheel hubs and only the pointed rear part rises above the hub level.

The propelling engine 14 occupies the space within and below the narrow part of the sub-frame and under the arched cross brace 12. It may be mounted on that frame with appropriate cushionings, if desired, but is preferably mounted on a second frame 15, herein called the main frame, which carries the body 1 and is spring-supported. This frame extends from a rear point just forward of the rear wheel to a forward point well beyond the forward wheels and has a kick-up over the forward axle. Its rear part lies in substantially the same level as the legs of the sub-frame and between them and about one-third of its length overhangs the forward axle.

Cross bracing, not shown, may be provided to give it requisite stiffness. Its forward point of support is by a cross bolster 16 and a transverse spring 17 which is shackled at its ends to appropriate brackets on the axle structure; see Fig. 5. At its rear end it is flexibly connected to the sub-frame in such manner as to accommodate the action of the forward spring and preferably the connection includes a spring such as cross-spring 18 which is centrally fastened to the cross-bolster 19 of the main frame and suspended at its ends by a pair of hanger-links 20 depending from the high part of the sub-frame. These links include turn-buckles, as indicated, which can be adjusted to raise or lower the main frame. By reason of their substantial parallelism they permit a certain amount of sidesway to the main frame relatively to the subframe but tending at the same time to restrain careening of the body.

The chassis of the illustrated vehicle thus includes the sub-frame which as stated is unsprung, and the main frame which is sprung both front and rear. It is desirable that the normal amplitude of the rear spring action be relatively less than that of the front spring. This can be done by loading it with a resistance of some sort, such as provided by connecting ordinary hydraulic shock absorbers 21 between the two frames at this point. If absorbers are also associated with the front spring, as indicated at 22, the resistance of the rear absorbers is made to exceed materially that of the front absorbers, so that the action of the rear spring is relatively stiff or sluggish. The throw of the rear spring is limited by a check rod 23 which is connected at its foot with the end of the main frame or with the cross bolster 19 thereof or otherwise and plays in a hole in a cross flange 24 (Fig. 3) of the sub-frame 11 with rubber-backed collars 25 fixed on the rod above and below such flange. These collars coact with the flange as spring-bumpers, in both directions, and in addition the upper collar serves also as a safety support to hold the main frame in the event of failure of its rear spring or support. The engine is mounted with the end of its crank shaft accessible to the rear through a hole marked 26 and the check rod is attached to the frame by a connection above this hole, as indicated in Figs. 3 and 7 so that by turning the steering wheel to a transverse position room is available to introduce a hand crank in the hole when the engine requires to be hand cranked.

The transmission case is on the forward end of the engine and connected to drive the forwardly extending propeller shaft 5 through an appropriate universal joint or joints and with or without a torque tube as preferred. The transmission mechanism is controlled by a selector rod 27 extending forwardly to the gear shift lever 28 at the operator's station. The usual engine controls though not shown in the drawings, will be understood to be arranged in any suitable way.

In the case of a watercooled engine, the radiator 29 is preferably located directly over the transmission or flywheel case and just abaft the after bulkhead wall 30 of the cabin compartment, and suitable partitions 31 and 32 (Fig. 6) are provided to form an air channel for conducting air to it from an air scoop slot 33 which extends across the roof part of the body. A fan 34 is located in the air channel, being driven by the engine in any suitable manner, as for example, by the belt-driven shaft 35, which is journalled on the engine and extends through the radiator.

The cooling air passing the radiator flows over the engine and out around the rear wheel.

While the body 1 can be variously constructed and wholly of metal, if desired, it is shown as built of wood framing with a light metal covering. Its main sills 36 are carried on brackets 37 which project laterally from the main frame, some of them extending over and some under the legs of the sub-frame and all shaped or located to afford the necessary clearance for the relative movement of the unsprung sub-frame and the sprung main frame. These sills extend aft of the main frame, as cantilevers to support the tail part of the body. Doors and windows are provided and also a number of removable panels, those marked 38 being for providing access to the forward wheels and those marked 39 to afford access to the engine while the rear end or bussle 40 is removable to afford access not only to the rear wheel but also to the crankshaft of the engine for hand-cranking it. The forward windows 41 are either curved to the streamline contour or composed of smaller flat sections collectively approximating such contour.

The bottom of the body is preferably closed by a belly wall in one or more sections which are longitudinally and transversely curved to conform to the streamline contour. To this end the metal body covering below the sills 36 is inwardly curved at the sides, as indicated at 42 and the middle space is closed in by a curved belly wall section marked 43 in Figs. 1 and 3. This section 43 of the belly wall is a part of the body proper. Next in rear of the belly wall section 43 comes a continuation section 44 which is removably fastened to the unsprung parts of the chassis, that is, to the differential casing and the legs of the sub-frame, the forward attachment points being marked 45 and the rear points 46 (Fig. 3). Aft of this section and extending to the end of the tail, the belly wall section 47 is fastened to the incurved sides 42 of the body in some removable manner and this section is cut with a circular hole 48ª (Fig. 4) to accommodate the rear steering wheel. As thus organized the belly wall is formed of three sections of which two are carried by the body proper and the other intermediate section by the running gear. The sections meet without contact in normally flush relation so as to provide a substantially smooth belly from front to rear but it will be apparent that the edges will play past each other according to the action of the springs. The gap may be covered or faired over if desired to exclude entrance of air. While shown as made of metal the belly wall may be made of fabric, if desired, in which case it may be continuous from end to end.

By thus enclosing the whole running gear including as much of the wheels as consistent with road clearance in a properly streamline external contour, the advantage is gained that the rate of fuel consumption, as compared with conventional cars of equivalent size and weight, falls off rapidly as the speed is increased above about 10 M. P. H., being some 30% less at 30 miles and 50% less at about 50 miles, while within the overall dimensions of such conventional cars the volume of useful cabin space inside the streamline body is much increased, being practically doubled. All of the interior of the body forward of the drop-angle or bulkhead wall 30 constitutes the useful space for passenger or cargo, and due to the drop-angle the rear seat can extend the full width of the body over the sub-frame 11, as well as over the main frame 15 and with cars of standard tread gauge this provides a seat some 6 feet wide, long enough to serve as a bunk for sleeping purposes.

The forward overhang of the main frame 15 pitches upwards from the forward wheels and terminates at about the bumper level of conventional cars or slightly higher, the purpose of which among other things, is to take any collision impact in the event of accident at a point well in advance of the front seat and to receive it on the main frame, so that the inertia of the engine fixed on the rear of that frame will be available to absorb the impact, as is the case in conventional cars having the engine in front.

Steering is done by a hand-wheel 48 mounted at a convenient angle in front of one of the forward seats and according to this invention its connections to the steering head 9 provide for a maximum variation of steering angle of at least about 160° and in any event over 100°. With the traction wheels located at one third the body length abaft the front end, such range of steering angle affords a degree of maneuverability not heretofore attained in automobiles. In the present case the steering system includes a windlass contained in a case 50 with cables 51 trained over sheaves on the chassis or sub-frame and attached to the ends of the sprocket chain 52 of a full circular sprocket wheel 53 which is fixed to and below the steering head 9. By the use of a full circular sprocket wheel the same constant degree of tautness is kept in the cables for every steering angle, without which the steering would be erratic and unsatisfactory. A keeper or guard 54 is provided about the sprocket wheel rim to guide and retain the chain thereon. This keeper is fixed by rigid bracket arms to the steering head barrel 10 of the sub-frame 11, directly over the steering-wheel mud guard 55 which turns with the steering head 9. The lugs 56 (Fig. 4) on the ends of the sprocket chain serve to limit the steering angle by their abutment against the ends of the keeper 54. They limit the steering range to something less than 180° of arc. The gear ratio of the steering system is about 30 to 1 and in order to make quick changes through large angles, the hand-wheel 48 is provided with a crank knob 57 by which it may be easily spun.

While rear-steering greatly improves maneuverability as compared to conventional cars, and particularly with the traction wheels in the position described, it is apt to give rise to a tendency to skid when braking or rounding corners. This however is eliminated according to this invention by the distribution of the weight and the location of the center of gravity of the vehicle. It is found that such center should be forward of the mid-point of the wheel base and must not in fact be located further aft from the forward wheel axis than a distance equal to about 40% of the wheel base length. The importance of the pronounced forward body overhang will now be apparent, since even with the engine in rear it brings the center of gravity to the position of maximum safety against skidding. In the car taken for illustration, the center of gravity is about 20% aft of the front axle, some 75% of the total weight being on the two forward wheels, and this location of the gravity center is preferred. The normal loading of the vehicle will not appreciably shift it. Also specially contributing to the maneuverability and ease of handling generally is the fact that the traction center as well as the gravity center are both located in the same general position, forward of the center point of the wheel base and that this position also substantially coincides with what may be called the streamline center of the body which may be taken as its center of volume or the center of area of its axial section. This center is indicated roughly in Fig. 3 by the small circle 58; the gravity center is lower down and the traction center of course coincides with the axis of the front wheels. The consequences of the grouping of these important centers in the same general forward location are reflected in the structural economy of the vehicle and become obvious on comparison with the action of conventional cars and especially those which have their traction center rearward of the mid-point of the wheel base.

A view to the rear is afforded to the driver through a water-tight roof window 59 and an exterior inclined mirror 60 mounted on the roof at its highest point and within a rearward open hood or fairing 61 to avoid wind resistance and also shelter the mirror from the weather. The mirror may be viewed through the window and by reason of its position at the highest point gives unobstructed vision to the rear through a wide arc. This makes it easy for the driver to avoid swinging the tail of the vehicle so far to the outside when turning a corner, as to collide with adjacent cars or objects. To the same end the invention contemplates as an additional safeguard, useful in the case of drivers unaccustomed to rear-steered vehicles, a warning device of some kind which will announce the fact whenever the driver turns the rear wheel to such an angle as might be likely to result in a sideswipe. This may take any suitable form and as shown herein consists of a wiper button 63 (Fig. 4) fastened to the steel steering cable 51 and adapted to contact with either of two electrically insulated terminal plates 64 mounted on a cross bar 65 and connected in circuit with a buzzer or the like 66. Whenever the rear wheel reaches or passes the angle which will run it outside of the tracks of the forward wheels, the signal is given and the driver's attention is thereby called to the need of caution in the event there should be an adjacent object in position to be sideswiped. When operating within the limits represented by the two terminal plates the driver may handle the car without concern for side collisions more than with ordinary automobiles. Instead of an audible signal any other device may be employed which will guard against involuntarily exceeding the normal range of steering angle.

A brake pedal is indicated at 62 but the braking system has been omitted; it may be applied to all three wheels, if desired, but braking on the two forward wheels alone has been found sufficient with the weight distribution as described.

While the various features of this invention have been above described as mutually combined and cooperating in a single structure which is rear-steered, it is to be understood and will be apparent that there is no intention to limit this patent to such single combination inasmuch as certain subcombinations set forth in the claims obviously have important uses in independent relations.

I claim:—

1. A motor road vehicle having a drop-angled sub-frame comprising horizontal members supported on two vehicle wheels and inclined members supported on a single wheel, an engine occupying the space between said inclined members and an aeronautical streamline body enveloping all the wheels and containing a cross-seat extending the full width of said body over the horizontal members of said sub-frame.

2. In a motor road vehicle, an axle housing supported on two forward wheels, a sub-frame having a wide supporting base thereon and a point of support on a rear wheel, a main frame spring-suspended from said sub-frame adjacent said rear wheel and spring-supported on said housing independently of said sub-frame.

3. In a motor vehicle, a sub-frame mounted at one end on the axle housing of two forward, driven wheels and at the other on a single wheel, a main frame supported at its rear on said sub-frame and at a forward point on said housing, and having a kick-up over said housing and an overhang forward thereof.

4. In a motor vehicle, a frame connected by a horizontal joint to the axle structure of two forward wheels and supported at its other end upon a single swivelled wheel, and an engine supported by said frame having a propeller shaft connection to said two wheels.

5. An automotive road vehicle having a rigid frame with a horizontal part supported on two forward non-steering wheels and an inclined part supported on the steering head of a rear steering wheel and holding said steering head rigidly in a plane having a fixed relation to the planes of the non-steering wheels, an aeronautical streamline body spring-supported upon and covering all said wheels and spring-supported propelling means for differentially driving said non-steering wheels.

6. A motor road vehicle comprising a torsionally rigid sub-frame having a wide supporting base upon two vehicle wheels and extending therefrom horizontally and then upwardly to a steering head above the axis of a single swivelled wheel, a spring-supported main frame having members disposed alongside of the horizontal parts of said sub-frame, and a streamline body enveloping both frames.

7. In a motor vehicle, a sub-frame supported at one end on the axle structure of two forward wheels and at the other on a single rear steering wheel, and adapted to maintain the steering axis rigidly in a plane having a fixed relation to the planes of the forward wheels, a main frame supported at its after end on said sub-frame and spring supported on said axle structure and extending forwardly thereof and of the sub-frame and a streamline body on and covering both frames and all the wheels, said frames having their longitudinal portions extending substantially at the same level.

8. In a motor road vehicle, a sub-frame connected to the axle structure of two forward wheels and supported aft upon a rear steering wheel and adapted to maintain the steering axis in fixed relation to the planes of the forward wheels, a main frame supported aft on said sub-frame and having a spring-support directly on said axle structure and a spring-supported engine having a propeller shaft drive to said axle structure for driving the forward wheels, the longitudinal portions of said frames being horizontally adjacent each other.

9. A motor road vehicle having two forward non-steering wheels, a rear-steering wheel, a torsionally rigid sub-frame having a horizontal part supported on the forward wheels and an inclined part supported on the steering head of the rear wheel, a streamline body having its cabin space overlying the horizontal part and said body covering all said wheels and spring-supported thereon, and a spring-supported engine connected to said forward wheels.

10. In a motor road vehicle, a sub-frame supported at one end on the axle structure of two wheels and at the other end upon and above a swivelled wheel, and a body-carrying frame having one end suspended by substantially parallel hanger links from the part of said sub-frame adjacent the swivelled wheel and having its other end spring-supported on the axle structure.

11. In a motor road vehicle, an unsprung sub-frame, a main frame having one end located below or not above the sub-frame, means including a spring for supporting the main frame from the sub-frame and independent means for limiting the downward movement of the main frame relatively to the sub-frame.

12. An automobile comprising body, wheels and engine in the following form and relation viz., the body having the form of a unitary aeronautic streamline body, in plan and elevation, and its maximum cross-section occurring at about one-third of the distance from the bow end; the engine being in the rearmost part of such body; the road wheels being all included within such body and the forward wheels being driven by the engine and rearwardly spaced from the bow end to provide a substantial forward overhang of the body counter-balancing the engine weight to such extent as to establish the center of gravity of the unloaded vehicle at a point forward of the wheel base center.

13. An automobile comprising body, wheels and engine in the following form and relation viz., the body having the form of a unitary aeronautic streamline body, in plan and elevation, and its maximum cross section occurring at about one-third of the distance from the bow end; the engine being in the rearmost part of such body; the road wheels being all included within and laterally shielded by such body and the forward wheels being driven by the engine and rearwardly spaced from the bow end to provide a substantial forward overhang of the body counterbalancing the engine weight so as to establish the center of gravity of the unloaded vehicle at a point forward of the wheel base center; the passenger or load-receiving space within the body having its greatest volume in advance of said center of gravity.

14. An automobile comprising body, wheels and engine in the following form and relation viz., the body having the form of a unitary aeronautic streamline body with substantially unbroken external curvature from end to end, in plan and elevation, and its maximum cross section occurring at about one-third of the distance from the bow end; the engine being in the rearmost part of such body; the road wheels including front tractor and rear steering wheels all located within and laterally shielded from the external air flow by such body, the forward wheels being rearwardly spaced from the bow end to provide a substantial forward overhang of the body counterbalancing the engine weight so as to establish the center of gravity of the unloaded vehicle at a point forward of the wheel base center; the passenger or load-receiving space within the body being forward of the engine and having a substantial part in advance of said forward wheels.

15. An automobile comprising body, wheels and engine in the following form and relation viz., the body having the form of an aeronautic streamline body with substantially unbroken external curvature from end to end, in plan and elevation, and its maximum cross section occurring at about one-third of the distance from the bow end; the engine being in the rearmost part of such body; the road wheels being all included within such body and including a single rear steering wheel, the forward wheels being driven by the engine and rearwardly spaced from the bow end to provide a substantial forward overhang of the body counterbalancing the engine weight to such extent as to establish the center of gravity of the unloaded vehicle at a point forward of the wheel base center; the passenger or load-receiving space occupying the forward part of said body.

16. In a motor road vehicle, the combination of the forward and rear wheels, a body-carrying frame spring-connected at its rear end with a rear wheel, said frame extending forwardly from such rear spring connection and forwardly overhanging said forward wheels, spring connection means between said frame and the forward wheels, said means having a wider normal range of spring action than the range permitted by said rear spring connection, the body on said frame having a load-compartment approximately centered over the axis of the forward wheels.

17. In a motor road vehicle, the combination of a subframe on forward and rear wheels, a main frame flexibly connected at its rear end to the rear of said subframe and extending forwardly from such connection to a position of substantial overhang forward of said forward wheels, spring suspension means between said main frame and the forward wheels permitting a wider normal range of spring action than that permitted by said rear flexible connection, and a body on said main frame having its load-receiving compartment substantially centered over the axis of said forward wheels.

18. In a motor road vehicle, the combination with the forward and rear road wheels, of two spring-connected frames with their ends overlapping each other near the center of the vehicle and one extending to one end of the vehicle and the other to the other, a rear wheel being journalled to the frame that extends to the rear of the vehicle and a body carried by the other frame and enclosing both said frames, an engine in the rear part of said body and a cabin in the fore part thereof above the forward wheels.

19. In a motor road vehicle the combination with the forward and rear road wheels, of two spring-connected frames, one being within and at the level of the other near the center of the vehicle, and one extending to one end of the vehicle and the other to the other, one of said frames being directly carried unsprung on said road wheels and a body of streamline contour carried on the other frame and enclosing both frames and said wheels.

20. An automobile comprising a body having the form of a unitary aeronautic streamline body with substantially unbroken external contour from end to end on its top and sides and partially at least on its bottom, and its maximum cross-section occurring at about one-third of the distance from the bow end, road wheels for said body all included within such body contour, the forward wheels being rearwardly spaced from the bow end to provide a substantial forward overhang of the body, power means for driving the vehicle correlated to said body overhang to produce a center of gravity for the vehicle located forward of the wheel-base center and within 40% of the wheel-base distance back of the axes of the forward wheels, and a cabin compartment in said body having seats respectively forward and back of said wheel axes.

21. An automobile comprising in combination a body having the form of a unitary aeronautic streamline body, a sub-frame, a spring suspension between said body and sub-frame, road wheels journalled to said sub-frame, all of said sub-frame, suspension means and road wheels being included within the streamline contour of the body, and the forward road wheels being rearwardly spaced from the bow end to provide a substantial forward overhang of the body, propulsion means for the vehicle included within the body, said body overhang and said propulsion means being mutually organized to establish the center of gravity for the vehicle at a point forward of the wheel base center, and a load compartment in said body substantially centered over said forward wheels.

22. An automobile comprising a body having the form of a unitary aeronautic streamline body with substantially unbroken external contour on its top and sides, and its maximum cross-section occurring at about one-third of the distance from the bow end, two forward road wheels and a rear steering road wheel, a torsionally rigid frame comprising horizontal leg members to which said forward wheels are journalled and an inclined part supported upon and above said steering wheel, said body enclosing said frame and all of said wheels and extending forwardly for a substantial distance beyond said forward wheels and establishing a center of gravity forward of the wheel-base center.

23. An automobile comprising front and rear road wheels, a sub-frame to the ends of which said wheels are journalled, a main frame spring-supported on said sub-frame, and for its greater part being substantially at the same level as said sub-frame and extending forwardly of its forward spring support on said sub-frame to form an overhang, a body carried by said main frame and also overhanging said forward spring support, and propulsion means for the vehicle correlated to said overhanging parts to establish the center of gravity of the vehicle forward of the wheel-base center.

24. An automobile comprising a body with a bulbous bow end and a tapered rear end, road wheels for said body of which the forward wheels are rearwardly spaced from the bow end to form a substantial forwardly and upwardly pitched body overhang, a frame structure uniting said wheels and carrying the propelling engine therefor in the tapered rear end of said body, said frame structure extending forwardly of the forward wheels and upwardly into said bow end to a point therein at or above the level of the wheel axes, spring-supporting means intervening between said overhang and said forward wheels, the relative weights of said engine and overhang being correlated to establish the center of gravity of the vehicle within 40% of the wheel base back of the axes of said forward wheels.

25. In an automobile having a body with a wide bulbous front part carried on and over laterally spaced forward road wheels and a tapered stern carried on and over the rear steering road wheel, a driver's steering hand wheel in the wide front part of said body and steering gear connections between said hand wheel and said rear road wheel adapted to turn the latter through a maximum angle, the combination of means to guard against stern-swiping when driving such automobile around corners, which comprises a guard element moved by said steering gear connections, a relatively fixed coacting element set to coact with said guard element at that particular steering angle, less than said maximum, in which said rear wheel substantially tracks with a forward wheel and means for transmitting the effect of the coaction of said elements to the driver's attention.

26. An automobile comprising a body having a bulbous streamline form with its maximum cross-section occurring at about one-third the distance from the bow end, road wheels for said body included within said contour, the forward wheels being rearwardly spaced from the bow end to provide a substantial forward overhang of the body, said forward overhang constituting a forward continuation of the passenger space with its floor at substantially the same level as the floor in the midpart of the body, a propelling engine located in the narrow rear part of said body, said body having an entrance for engine cooling air in rear of said overhang, the relative weights of said rear engine and body overhang being correlated to locate the gravity center forward of the wheel-base center and within 40% of the wheel-base distance back of the axes of the forward wheels.

BUCKMINSTER FULLER.